(12) United States Patent
Cook

(10) Patent No.: US 7,985,043 B2
(45) Date of Patent: *Jul. 26, 2011

(54) TRANSPORT TRAILER

(76) Inventor: Mark Cook, Lufkin, TX (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/418,921

(22) Filed: Apr. 6, 2009

(65) Prior Publication Data

US 2009/0191033 A1 Jul. 30, 2009

Related U.S. Application Data

(63) Continuation-in-part of application No. 11/866,802, filed on Oct. 3, 2007, and a continuation-in-part of application No. 12/125,601, filed on May 22, 2008, now Pat. No. 7,896,603.

(51) Int. Cl.
B60B 29/00 (2006.01)

(52) U.S. Cl. .................................. 414/426; 414/331.14

(58) Field of Classification Search .................. 198/301, 198/312, 681, 682; 414/426, 427, 428, 564.679, 414/331.04, 331.14; 74/25, 89
See application file for complete search history.

(56) References Cited

U.S. PATENT DOCUMENTS

| | | | | | |
|---|---|---|---|---|---|
| 1,639,435 | A | * | 8/1927 | Nilsson | 198/637 |
| 1,830,373 | A | * | 11/1931 | Schmidt | 211/164 |
| 2,468,326 | A | * | 4/1949 | Gleason | 414/641 |
| 2,837,942 | A | * | 6/1958 | Howell | 408/241 R |
| 3,143,233 | A | * | 8/1964 | Evans et al. | 414/620 |
| 3,198,023 | A | * | 8/1965 | Norlander | 74/89.21 |
| 3,674,155 | A | * | 7/1972 | Kessler | 211/1.54 |
| 3,738,519 | A | * | 6/1973 | Edwards | 414/620 |
| 4,303,283 | A | * | 12/1981 | Mueller | 312/135 |
| 4,637,509 | A | * | 1/1987 | Raudat et al. | 198/419.3 |
| 4,770,577 | A | * | 9/1988 | Farris | 410/2 |
| 5,027,991 | A | | 7/1991 | Braddock | |
| 5,039,180 | A | * | 8/1991 | Lemons | 312/267 |
| 5,158,066 | A | * | 10/1992 | Dodgen | 126/25 R |
| 5,248,049 | A | * | 9/1993 | Murphy, Sr. | 211/164 |
| 5,356,163 | A | | 10/1994 | Suggs, Sr. | |
| 5,401,137 | A | * | 3/1995 | Nijenhuis | 414/679 |
| 5,421,318 | A | * | 6/1995 | Unruh et al. | 126/25 A |
| 5,476,035 | A | * | 12/1995 | Florindez | 99/443 C |
| 5,823,558 | A | | 10/1998 | Shoquist | |
| 5,915,913 | A | * | 6/1999 | Greenlaw et al. | 414/679 |
| 5,924,580 | A | * | 7/1999 | Chase | 211/131.2 |
| 5,927,931 | A | | 7/1999 | Raben | |
| 5,931,262 | A | * | 8/1999 | Greenlaw et al. | 187/244 |
| 5,938,145 | A | * | 8/1999 | Dueck | 242/559.4 |
| 5,960,488 | A | * | 10/1999 | Morris | 4/496 |
| 6,157,889 | A | | 12/2000 | Baker | |
| 6,296,434 | B1 | * | 10/2001 | Sato | 414/223.01 |
| 6,302,635 | B1 | * | 10/2001 | Kolker et al. | 414/341 |

(Continued)

*Primary Examiner* — Joshua I Rudawitz

(74) *Attorney, Agent, or Firm* — Browning Brushman, P.C.

(57) ABSTRACT

A trailer 10 includes a frame (12) having a central axis (14) spaced between rear wheels. A plurality of storage supports (20) are supported on the trailer frame, with each storage support supporting a plurality of objects thereon. A carousel assembly (24) rotates the plurality of storage supports, and may be raised and lowered. A locking mechanism (180) is provided for engaging the carousel to prevent the carousel from inadvertently moving to the lowered position. A tire support mechanism (210) includes an elongate restraint engaging an upright tire when a ratchet mechanism renders a flexible member taut.

20 Claims, 7 Drawing Sheets

U.S. PATENT DOCUMENTS

| | | |
|---|---|---|
| 6,382,644 B1 | 5/2002 | Rawlings |
| 6,527,499 B2 | 3/2003 | Leimbach et al. |
| 6,736,050 B1 * | 5/2004 | Monn .............................. 99/339 |
| 6,814,214 B2 | 11/2004 | Warlow et al. |
| 6,935,248 B2 * | 8/2005 | Warlow et al. ............... 108/55.1 |
| 2001/0028838 A1 | 10/2001 | Leimbach et al. |
| 2003/0226470 A1 | 12/2003 | Dibble et al. |

* cited by examiner

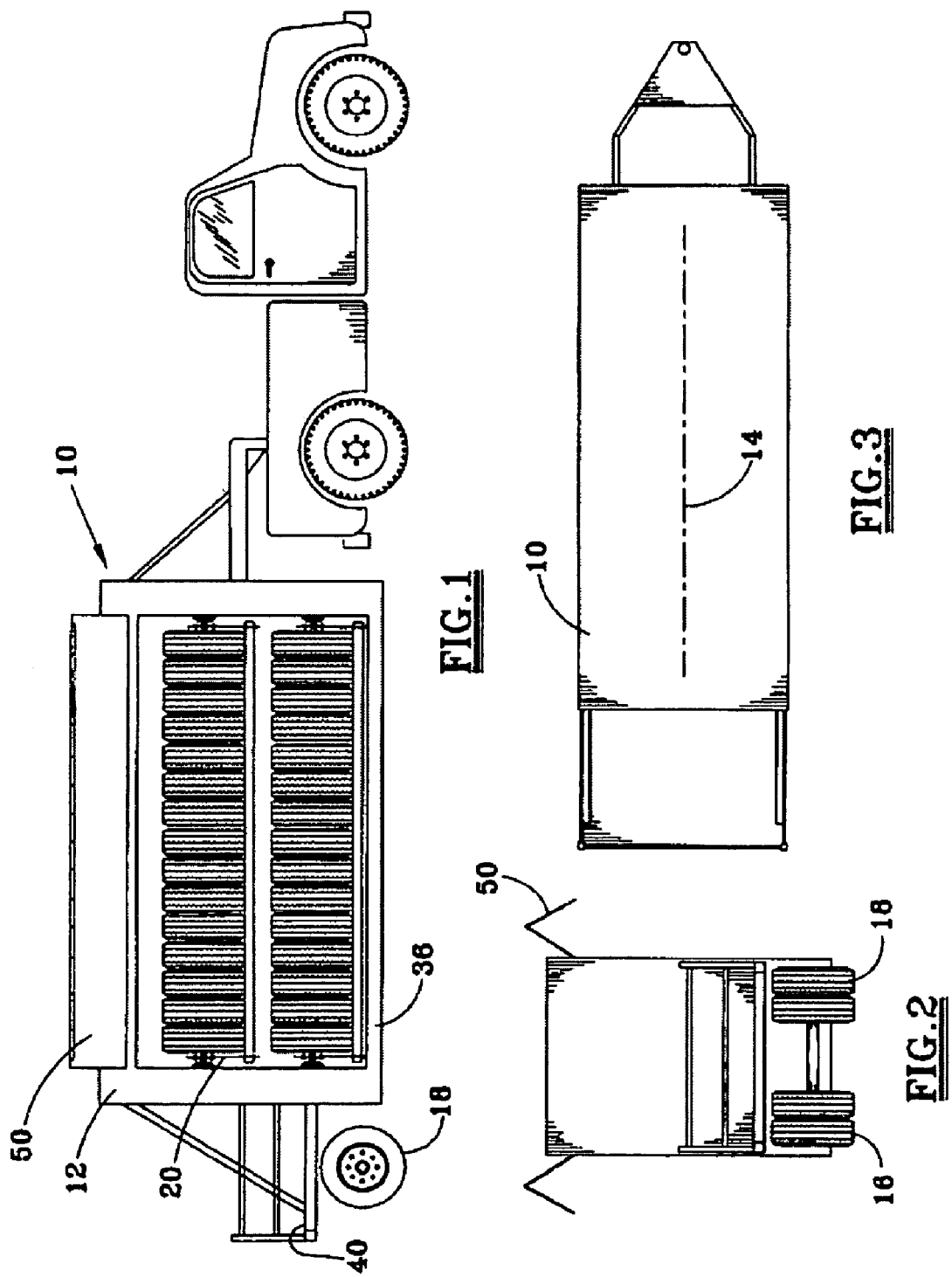

TRANSPORT TRAILER

RELATED APPLICATIONS

The present application is a continuation-in-part of U.S. Ser. No. 11/866,802 filed Oct. 3, 2007 and U.S. Ser. No. 12/125,601 filed May 22, 2008 now U.S. Pat. No. 7,896,603.

FIELD OF THE INVENTION

The present invention relates to trailers of the type conventionally used for transporting objects, including trailers removably connected to or integral with a powered operator cab. More particularly, this invention relates to an improved trailer for reducing injury to transport personnel. In one embodiment, the trailer may be used to transport tires which are supported on storage racks.

BACKGROUND OF THE INVENTION

Various types of trailers have been devised to transport objects, and trailers have been specifically designed for transporting one type of object. Nevertheless, a considerable time and money are incurred in loading and unloading selected ones of the transported objects at a specific location. Moreover, trailer workers are commonly injured when loading and unloading objects from a trailer, particularly when the objects are heavy and/or bulky.

U.S. Pat. No. 6,814,214 discloses a unitary trailer and powered operator cab. The trailer includes a pallet and conveyor system for loading pallets onto the vehicle, with the pallets movable in an elongate loop with front and rear ends of the loop rotating about an axis parallel to the vehicle's axis.

Various types of patents disclose systems for generally transporting tires. U.S. Pat. No. 5,927,931 discloses a lift for raising and lowering a stack of tires. U.S. Pat. Nos. 5,027,991 and 5,356,163 each disclose structures for transporting a single tire. U.S. Pat. No. 6,382,644 discloses a transport and a tire and wheel assembly. A device referred to as the Tire Butler being promoted by Mobile Concepts, Inc. uses a trailer for transporting tires. Publication 2001/0028838 and U.S. Pat. No. 6,527,499 also disclose equipment for handling and transporting tires.

U.S. Pat. No. 5,823,558 discloses a trailer loading support. A load distribution system for trucks is disclosed in U.S. Pat. No. 6,157,889. Publication 2003/0226470 discloses a rail transport system for bulk materials.

The disadvantages of the prior art are overcome by the present invention, and an improved delivery trailer and method of operating a delivery trailer are hereinafter disclosed.

SUMMARY OF THE INVENTION

In one embodiment, a trailer for transporting objects includes a trailer frame having a longitudinal axis. A carousel is provided for rotatably supporting a plurality of storage units about a carousel axis substantially parallel with the trailer longitudinal axis. A powered carousel rotator rotates the plurality of supports about the carousel axis. Each supporting unit supports a plurality of objects thereon and has a storage support axis substantially parallel to the trailer frame longitudinal axis. In this embodiment, a lift mechanism selectively raises and lowers the carousel axis from a raised position to a lowered position. A locking mechanism is provided for engaging each of the front plate and rear plate of the carousel to prevent each plate from inadvertently moving to the lowered position when the vehicle is other than in a parked position.

In another embodiment, the trailer frame and carousel are provided, as discussed above, and a tire support mechanism is utilized for supporting one or more tires on a respective storage support. The tire support mechanism includes an elongate restraint, with ends of the restraint configured to engage opposing sides of an upright tire positioned on the support. A restraint support supports the elongate restraint on the upright tire, and an elongate flexible member connected to and extending from one of the front plate and rear plate of the carousel extends to either the elongate restraint or the restraint support. A flexible member ratchet is provided for adjusting a length of a flexible member between a respective end plate and the elongate restraint for locking the elongate restraint in position with respect to the upright tire.

These and further features and advantages of the present invention will become apparent from the following detailed description, wherein reference is made to the figures in the accompanying drawings.

BRIEF DESCRIPTION OF THE DRAWINGS

FIG. 1 is a side view of a suitable trailer and powered operator cab with the side doors raised.

FIG. 2 is a rear view of the trailer shown in FIG. 1, with the side doors raised.

FIG. 3 is a top view of the trailer shown in FIG. 1, with the side doors closed and the operator cab removed.

DETAILED DESCRIPTION OF PREFERRED EMBODIMENTS

Figure 4:
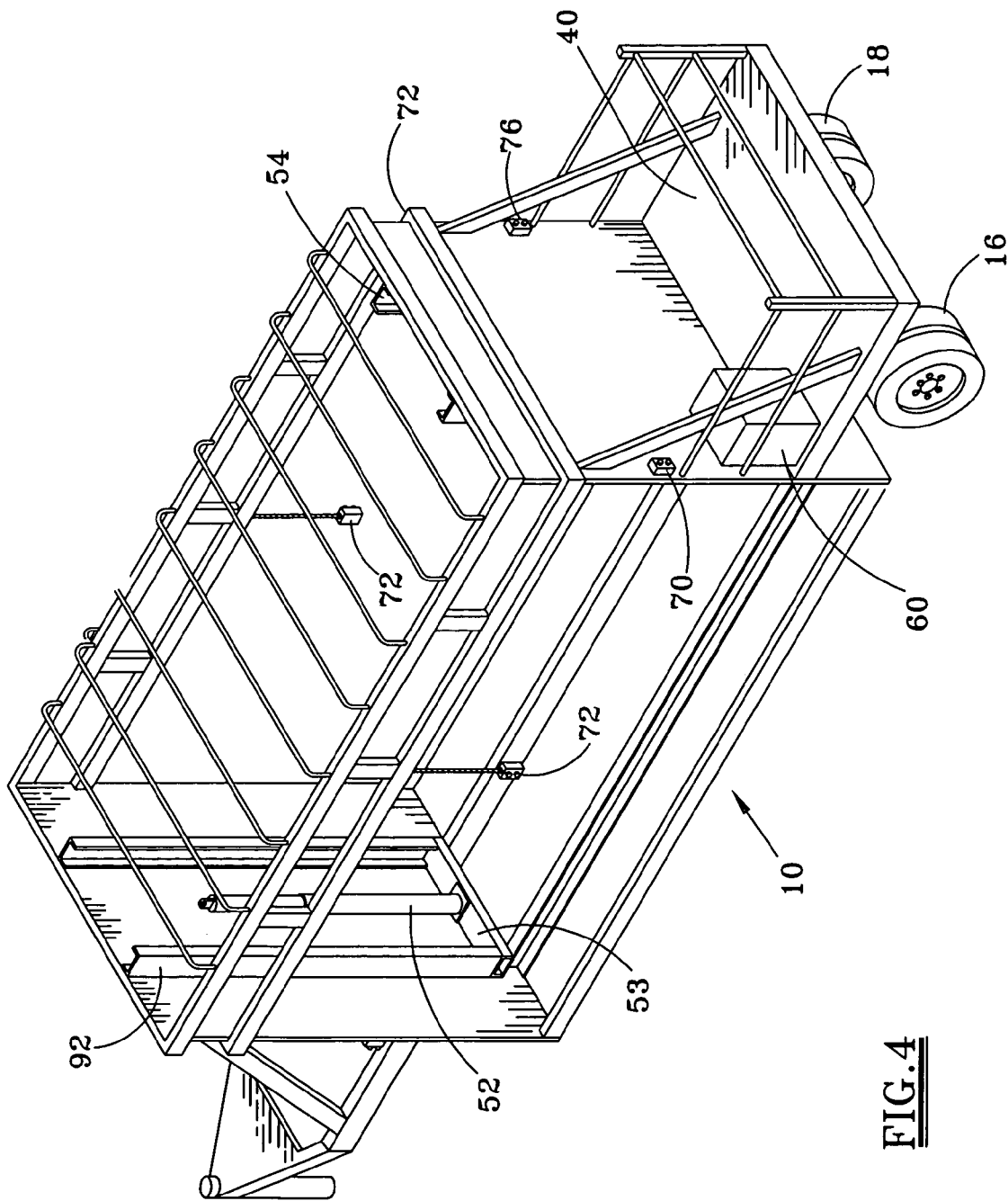
FIG. 4 is a pictorial view of a portion of the trailer shown in FIG. 1.

FIG. 1 discloses one embodiment of a trailer 10 for transporting tires. For the depicted embodiment, a powered operator cab may be used to transport the trailer removable from the cab, or the trailer may be integral with the frame of the powered transport cab. In the latter case, the combination of a trailer and a cab is generally referred to as a truck.

The trailer includes a trailer frame 12 having a central axis 14 which, as shown in FIG. 3 is spaced between a left-side rear wheel 16 and a right-side rear wheel 18. As disclosed further below, the trailer frame supports a plurality of storage units 20, which for the embodiment depicted in FIG. 1, is a plurality of tires. Each storage unit has a storage support axis 22 which is substantially parallel to the trailer central axis 14.

Figure 5:
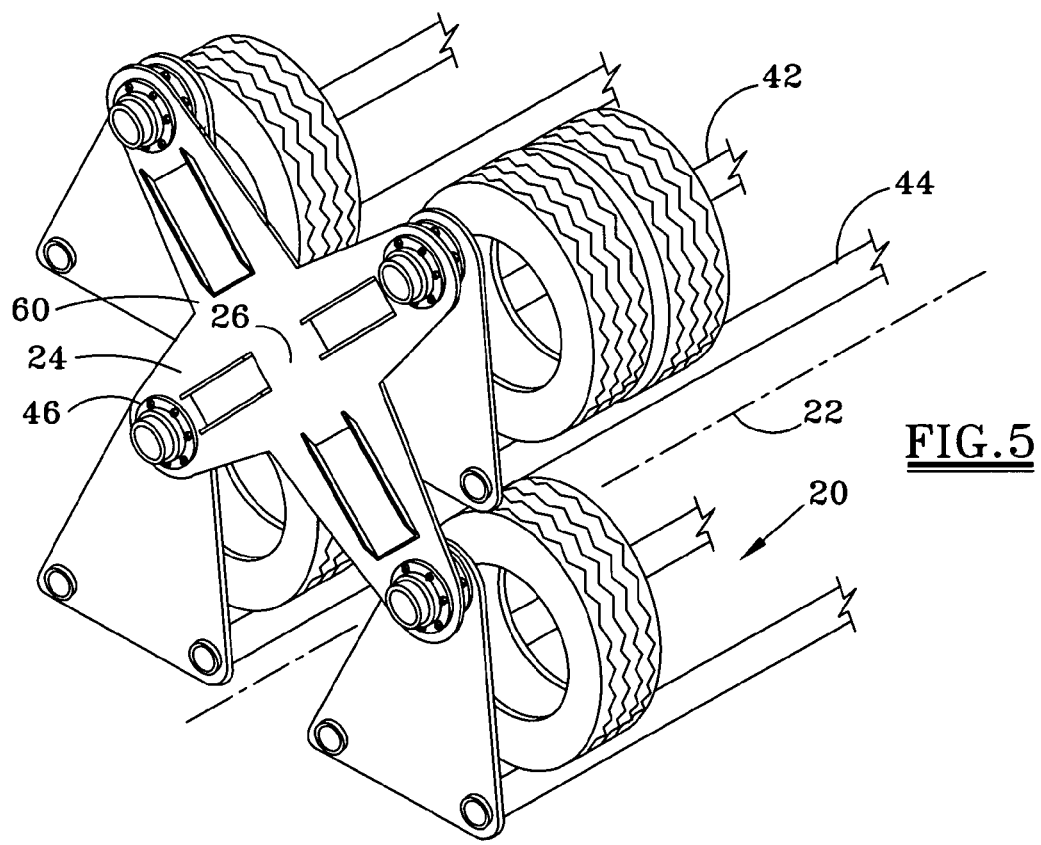
FIG. 5 illustrates a portion of the carousel assembly.
Figure 6:
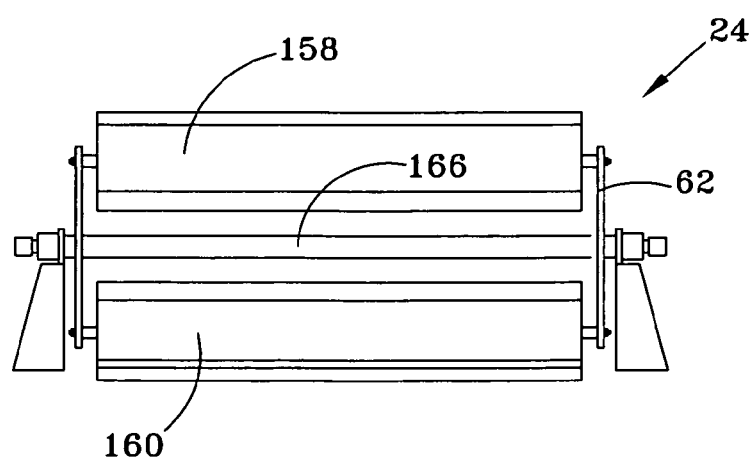
FIG. 6 illustrates a side view of an alternate drive mechanism for rotating the carousel.

A portion of the carousel assembly 24 is shown in FIG. 5, and rotatably supports the plurality of tires about a carousel axis substantially parallel with the trailer central axis. A lift mechanism 30 as shown in FIG. 6 is provided for raising and lowering the carousel and thereby the objects supported on the storage units with respect to the trailer frame.

For the embodiment as shown in FIG. 1, the entirety of the carousel and the plurality of storage units are forward of the rear wheels of the trailer. A storage deck 40 is provided above the rear wheels for storing miscellaneous objects. As explained further below, the carousel assembly may be raised and lowered, so that when loading or unloading objects, the objects are desirably relatively close to the ground. As shown in FIG. 1, the low position of the tires relative to the ground is achieved by providing a lower portion 36 of the trailer frame which is vertically below the centerline of the wheels 16, 18. In a preferred embodiment, the trailer frame supports moveable side panels 50, which may be lowered to be flush with the exterior of the frame during transport, as shown in FIG. 3, but may be raised as shown in FIGS. 1 and 2 when the trailer is parked to allow for full viewing of the carousel operation.

FIG. 4 shows in further detail suitable components of the trailer 10. The frame 12 includes a pair of spaced apart front guides 52, with each guide suitably formed by a C-channel. A similar pair of rear guides 54 are also shown. These guides allow for the selective raising and lowering of the carousel by a pair of powered fluid cylinders 58. A lower portion of cylinder 58 is shown in FIG. 4 between the pair of front guides 52 and resting on a frame guide base 53. FIG. 4 also illustrates a suitable rear deck 40 for storage of miscellaneous components, including a power unit 60 for powering operation of the carousel assembly.

FIG. 5 illustrates a portion of the carousel assembly 24 which, for the depicted embodiment, includes 4 storage units each having a central axis 22 so that the storage unit may rotate as a subassembly about pivot 46 with respect to rotatable carousel end plate 62. For handling tires, the storage unit may include rods or other elongate supports 42, 44 as shown in FIG. 5, each extending between the spaced apart end plates 62 of the carousel assembly.

The carousel assembly 24 may be raised or lowered by a lift mechanism 30 including a pair of powered cylinders 58 and a guide plate 62 at the upper end of each cylinder. The moveable plate 62 includes a plurality of rollers or other suitable guides 64, which are guided by the front and rear supports for raising and lowering the carousel assembly.

Figure 7:
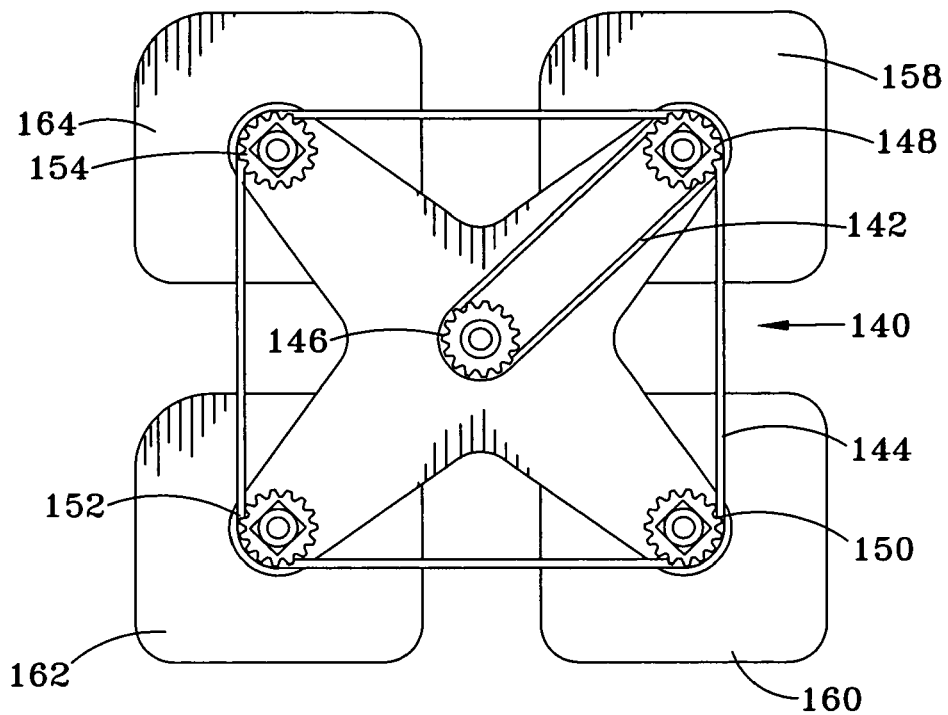
FIG. 7 illustrates an end view of the mechanism shown in FIG. 6.

FIG. 6 depicts a side view of a suitable carousel 24 including spaced apart front and rear end plates 62 which rotate with the central shaft 166, which in turn is driven by a suitable motor and brake assembly, as previously discussed. FIG. 6 depicts two of the supports 158 and 160, and two other supports 162 and 164 are shown in FIG. 7. The carousel drive motor, thus rotates the carousel. Rotation of the carousel rotates drive member 146 rotationally secured to the carousel, with member 146 preferably being one of a sprocket or a pulley, which in turn is connected by flexible member 142 to a driven member, such as sprocket or pulley 148, which in turn is rotatable with and associated with a respective support 150. Rotation of the carousel by the drive motor thus rotates the end plate 62 and the support 158. Sprocket 148 also acts to interconnect with the other driven members 150, 152 and 154 each associated with a respective support 160, 162 and 164. Rotation of the drive motor rotates the shaft 166 and simultaneously rotates each of the supports, so that a desired support will be positioned at a selected location relative to the vehicle frame during a loading and unloading operation. Since a conventional brake may be used with the drive motor, or the drive motor may have an internal brake, the assembly as shown in FIGS. 6 and 7 allows a single motor and brake as previously described to stop undesired or unintentional rotation of each of the supports due to the interaction of the flexible members 142 and 144. Conventional sprocket-type chains may be used for flexible members, or V-belts other timing belts may be used for this purpose. The system as shown in FIGS. 6 and 7 may be used regardless of the number of supports rotationally positioned about the central axis of the carousel. Four such supports are shown in FIG. 7, but any number of supports may be used depending on the goods to be transported.

Various controls 70, 72 as shown in FIG. 4 may be provided at desired locations on the trailer, including the sides of the trailer where objects are loaded and unloaded onto and from the storage units, and at the rear of the trailer near the power unit 60. These controls may be regulated by an operator to slowly raise the carousel, thereby allowing activation of the motor 66 to rotate the carousel so that the desired storage rack with the objects to be unloaded and loaded may be positioned on the desired side of the trailer and close to the ground. These controls 70, 72, if desired, may rotate the carousel in either a clockwise or a counterclockwise direction. Safety circuits may be used to ensure that the carousel is not rotated until raised to a sufficient level so that the carousel can rotate without hitting the lower frame of the trailer.

The storage supports as disclosed herein comprise a plurality of racks which are free to rotate with respect to the carousel end plates. In most applications, three or more racks may be equally spaced circumferentially about the carousel. A significant feature of the carousel assembly is that it allows the operator to load or unload goods from either side of the trailer. In some applications, the right-side of the trailer may be blocked, yet the operator may easily and safety unload goods from the left-side of the trailer. At the next delivery spot, the operator has the flexibility of unloading from the left-side of the trailer when the right-side of the trailer is blocked.

Depending on the goods being transported, the rotatable carousel assembly may benefit significantly from a lift mechanism, as disclosed herein. In other applications, and particularly those wherein the goods are relatively light, such as goods transported in the snack food industry, a lift mechanism for raising and lowering the carousel may not be necessary.

The trailer as disclosed herein has two opposing side doors and a rear door, with the rear door typically being used to unload and load non-standard sized products. In other embodiments, the trailer may have only one side door, or a side door and a rear door. In yet other embodiments, two or more side doors may be provided on either side of the trailer and/or additional rear doors may be provided, particularly for long trailers.

Figure 8:
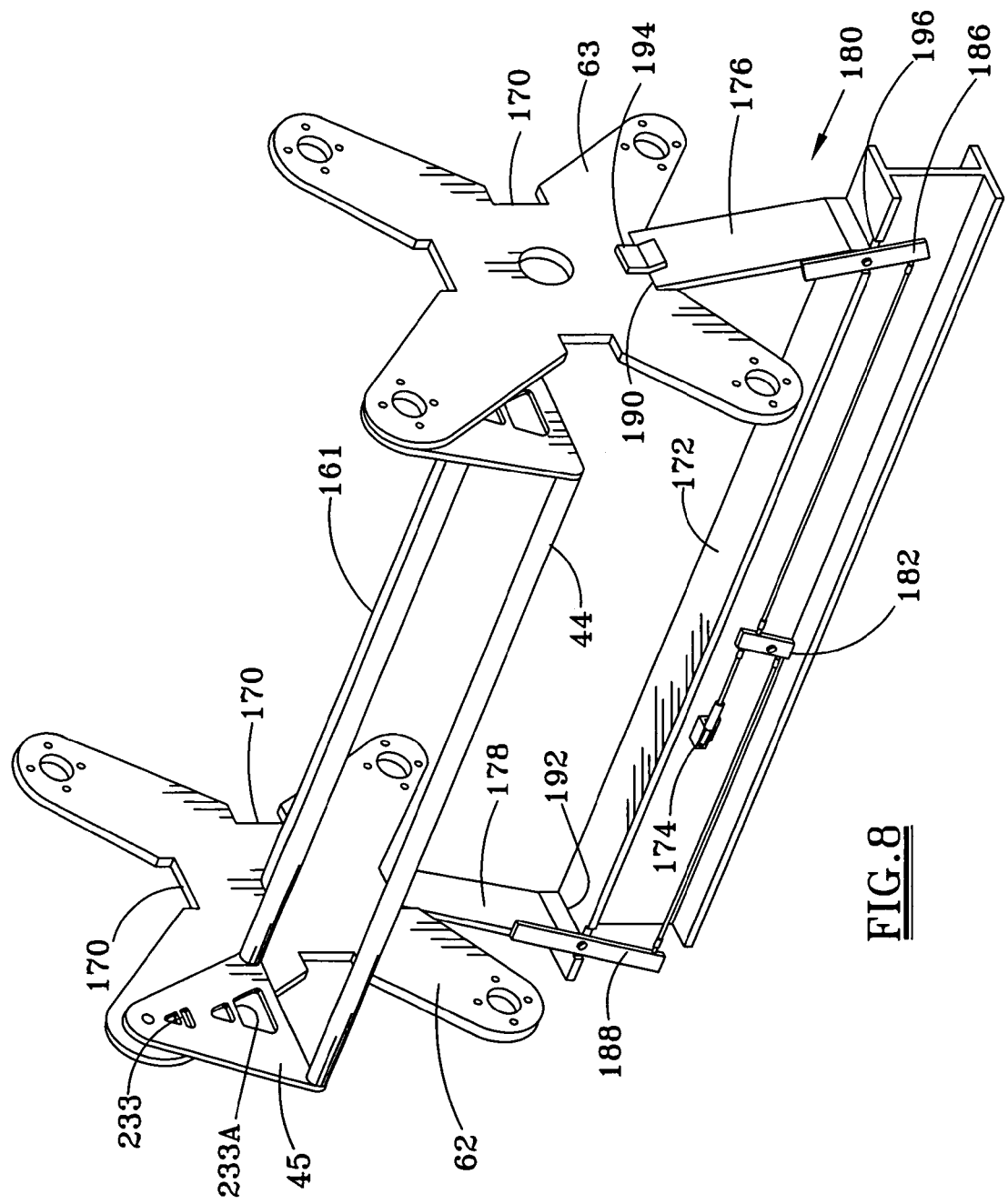
FIG. 8 is a simplified pictorial view of a rotatable carousel, illustrating only one of the tire supports, and illustrating a locking mechanism for maintaining the carousel in the upper or travel position.
Figure 10:
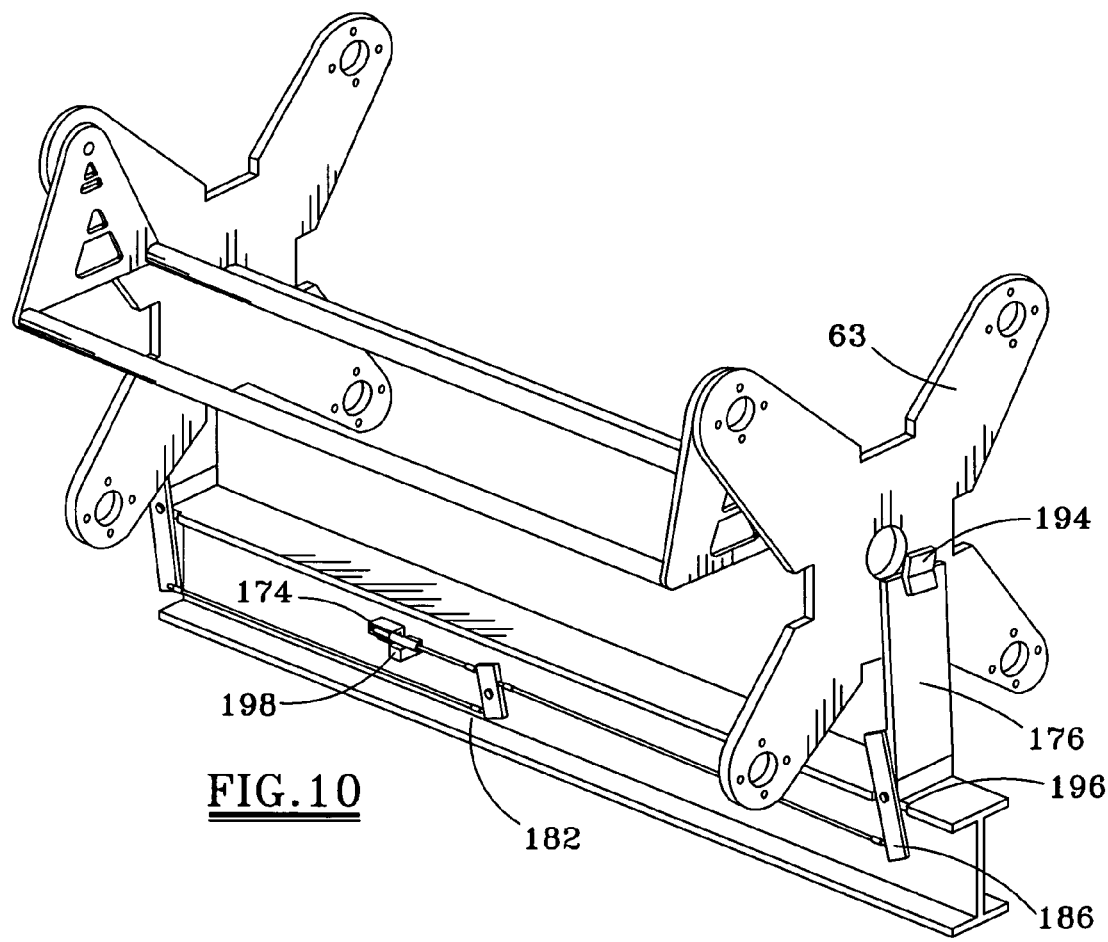
FIG. 10 is a simplified pictorial view of the assembly shown in FIG. 8 in the lower or carousel operate mode.

FIG. 7 depicts a simplified carousel with end plates 62, 63 as discussed above. The front and rear plates may be adapted for supporting four circumferentially spaced supports, with each support including a plurality of bins spaced along the support axis. The carousel may also be configured for supporting tires, wheels, or rims on each support, rather than bins to receive general goods. Each plate has a substantially clover-leafed design with a space between adjacent radial projections including a substantially planar surface 170 which engages the locking mechanism, as discussed below. A portion of the beam 172 shown in FIG. 8 may be part of the trailer frame, or may be secured to the trailer frame. Locking mechanism 180 may include a linear motor 174, which may be fluid powered or may be electrically powered, and preferably a front travel lock member 176 and a rear travel lock member or lock plate 178. Each travel lock member may be actuated by the motor 174 through the linkage mechanism 182, with levers 186 and 188 connecting the linkage mechanism to a respective travel lock. In the locking position as shown in FIG. 8, the planar surface 190 at the upper end of a travel lock 176 engages a respective planar surface 170 on the front plate 63, thereby providing planar-to-planar engagement between the plate and the travel lock. Similarly, the lower end of each travel lock when in a locked position includes a lower surface 192 which is in planar engagement with structural member 172, thereby similarly providing planar-to-planar engagement between each travel lock and the frame of the trailer. By providing planar-to-planar engagement at both the upper and the lower ends of the travel lock, the reliability of the locking system is significantly increased since forces may be reliably resisted without bending or otherwise damaging components. FIG. 8 also shows a stop member 194 which is provided at the upper end of each travel lock for ensuring that the travel lock is in the proper position with respect to a respective end plate when the locking mechanism is in the locking position, as shown in FIG. 8. Switch 198 as shown in FIG. 10 may prevent actuation of the actuator 174 until the switch receives a signal that the vehicle is in the parked mode. Brackets 186, 188 each pass through an oblong hole 196 in the frame to allow the actuator 174 to pivot each travel lock between the lock position and the disengaged position, with each of the travel lock plates being substantially vertical, as shown in FIG. 10, when in the disengaged position.

It is a feature of the invention that the travel lock or lock plate 176, 178 be in a substantially vertical position between a respective end plate 62, 63 and the structural frame of the vehicle, thereby allowing the travel lock or lock plate to reliably absorb sufficient forces to maintain the carousel in the upper position while the vehicle is in transit or is otherwise not in the parked mode. The plate of the travel lock is angled at 55° or more, and preferably 60° or more, with respect to the carousel axis (which can generally be presumed to be horizontal) while the lock plate is in the locking position. During travel, fluid pressure applied to the cylinders may leak, which otherwise may allow the carousel assembly to be inadvertently lowered with respect to the roadway. The travel locks prevent such movement, and also help to stabilize the carousel assembly while in transit since the weight of the carousel assembly may be supported by the travel locks rather than the fluid powered cylinders.

Figure 9:
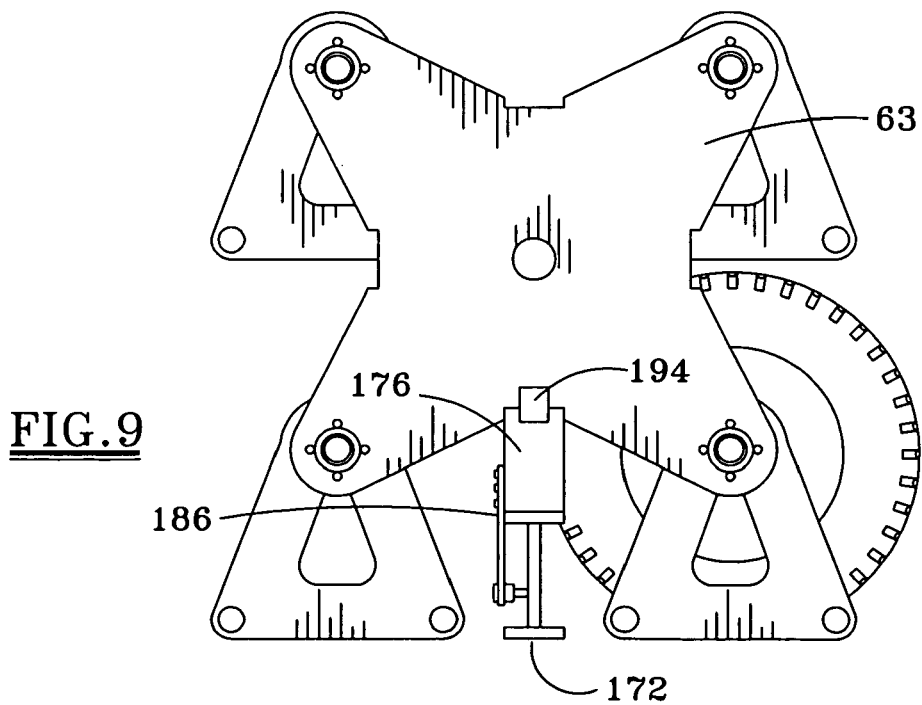
FIG. 9 is an end view of the simplified assembly shown in FIG. 8, although in this view each of the four supports of the carousel is shown, with a tire on one of the supports.

FIG. 9 is an end view of the assembly shown in FIG. 8, although in this view portions of each of the tire support devices are shown, with at least one tire positioned on one of the supports. FIG. 10 illustrates the travel lock in the disengaged position, allowing the carousel to freely rotate in response to its drive. Although both front and rear locking plates of the locking mechanism are preferred for engaging and supporting each of the front plate and the rear plate of the powered carousel, a single locking plate for engaging either the front plate or the rear plate may be suitable for some applications.

Figure 11:
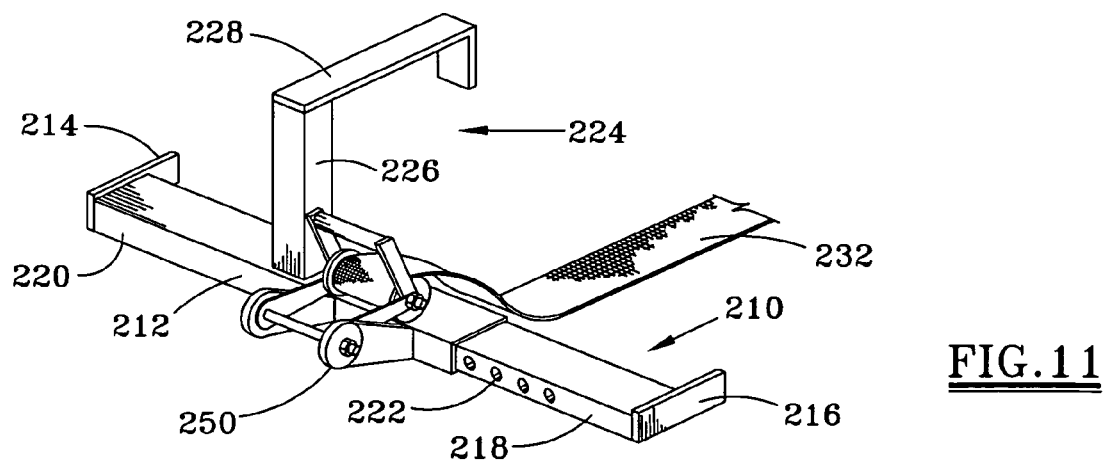
FIG. 11 illustrates a suitable tire support for mounting an upright tire in position on a carousel support.

FIG. 11 illustrates a preferred embodiment of a tire support for maintaining upright tires in position on a carousel support. Tire support mechanism 210 includes an adjustable length member 212, such as a strap, having end plates 214, 216 for engaging circumferentially opposing sides of an upright tire. As shown in FIG. 11, elongate member 212 may include an inner member 218 slidable within an outer member 220, with a plurality of apertures 222 spaced along the length of the inner member 218 for engagement with a pin (not shown) to lock the length of the member 212 in place. The mechanism 210 also includes a support member 224 which includes a vertical member 226 secured to the elongate member 212, and an L-shaped upper member 228 for positioning on top of a tire. Finally, the assembly includes a ratchet mechanism 230, which may be fixed to or slidable along the length of member 212, for selectively adjusting the length of strap 232 which extends from one of the end plates to the ratchet mechanism.

Figure 12:
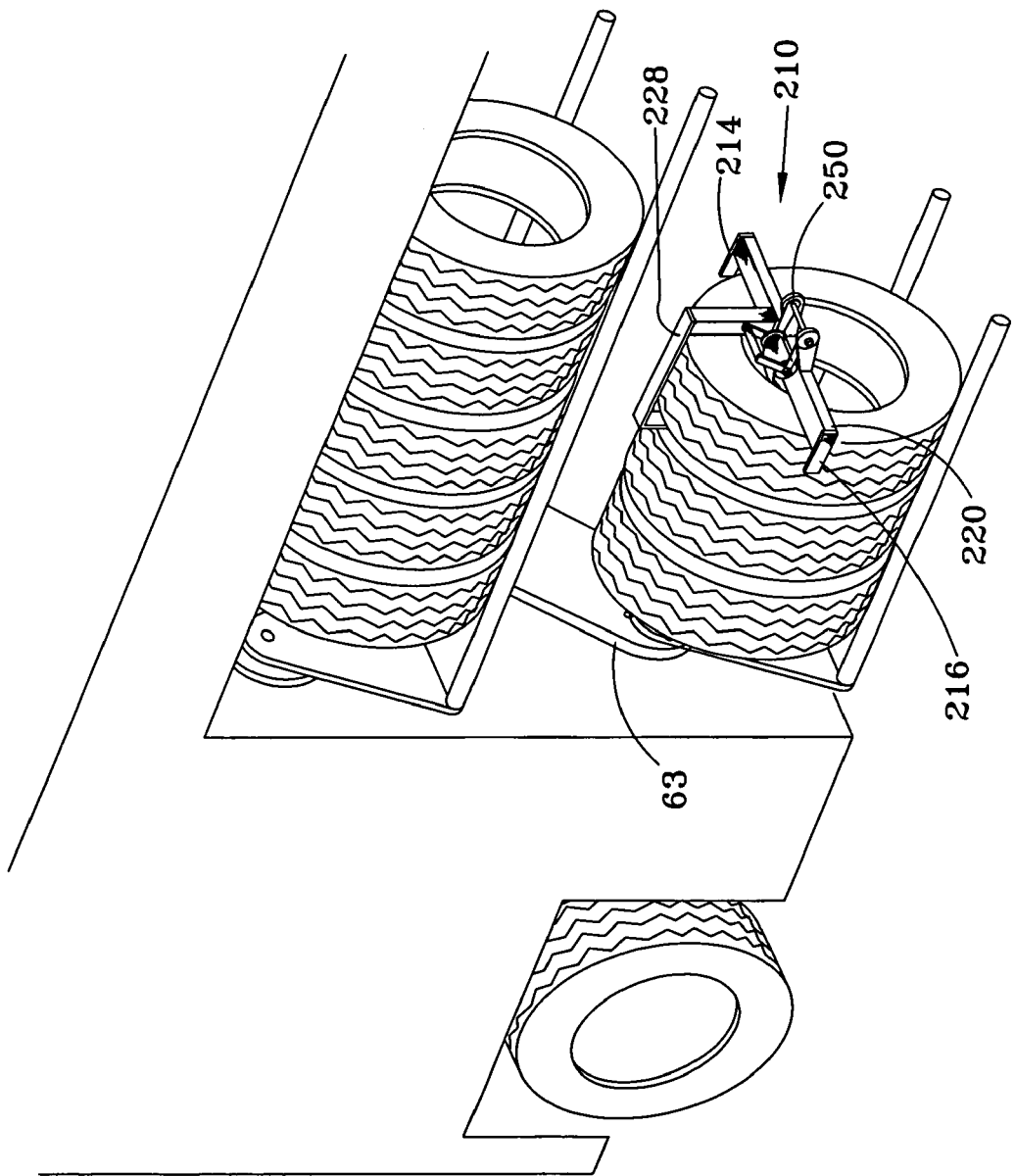
FIG. 12 illustrates the tire support shown in FIG. 11 in use on a trailer.

FIG. 12 shows the tire support 210 in position for holding a plurality of tires in the upright position. The tire support may be placed on top of the last tire in a series, and the strap 232 made taut by operating the ratchet 230 so that the tires are held in the upright position, as shown in FIG. 12. The significant advantage of the tire support as shown in FIGS. 11 and 12 is that the operation of securing the tires in the upright position on a support or rack may be easily accomplished with a single operator. The strap as shown in FIG. 12 may be secured to either the upper eye bolt 235 or the lower eye bolt 233A of a respective support plate 75. To secure tires or wheels, hook 231 at the end of the strap may be latched to the upper eye bolt 235. To secure rims in the support having a diameter appreciably less than a tire, the strap may be secured to the lower eye bolt 133A. The operator may thus pull the strap through all of the tires to be held, and then position the tire support on the last tire, as shown in FIG. 12. With the tire support still supported on a tire, the operator may feed the strap 232 through the ratchet device, and then simply operate the ratchet device in a conventional manner to make the strap taut, thereby maintaining all of the tires on the rack in the desired upright position. To remove one of the tires from the rack, the ratchet may be operated to loosen the strap, the strap removed from the ratchet, the tire support removed from the last tire, and the desired tire or tires removed from the carousel support.

In the preferred embodiment as shown above, the tire support has plates 214, 216 at each end of the elongate support for engaging circumferentially opposing sides of an upright tire. In some applications, a single end plate may be employed for positioning an elongate support with respect to the tire, although the elongate support would still extend between opposing sides of the tire. The ratchet as disclosed above is supported on the elongate support, but in another embodiment could be supported on the support member 224. As indicated above, a primary feature of the tire support is that a single operator can easily use the mechanism to support tires in the upright position on a carousel support.

The term "trailer" as used herein refers to a trailer removably connected to a powered operator cab, whether termed a tractor, a truck, or a cab, and includes fifth wheel trailers and gooseneck trailers. A "trailer" also includes the trailer portion of cab/trailer combinations, whether detachable from the cab or integral with the cab. A conventional utility truck for delivery of parcels or bread is thus considered to include a trailer which is fixed to rather than removable from the cab. The trailer of the present invention offers the ability to sort various products for delivery or pickup, to load the goods on either side of the trailer, and to handle heavy objects without significant lifting. A refrigerated trailer may be used for transporting dairy products, meat, or seafood.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:
1. A trailer for transporting goods, comprising:
   a trailer frame, the trailer frame having a longitudinal axis and including at least one side door at least substantially covering an opening in the frame when the side door is in the closed position;
   a powered carousel rotatably mounted within the trailer frame, the carousel rotatable about a carousel axis substantially parallel to the longitudinal axis, the powered carousel including a plurality of supports each disposed radially outward from the carousel axis for supporting goods thereon, and a front plate and a rear plate each connected to a front end of a plurality of supports and a rear end of a plurality of supports, respectively;

a lift mechanism for selectively raising and lowering the carousel axis from a raised position to a lowered position; and a locking mechanism for engaging at least one of the front plate and the rear plate to prevent the carousel from inadvertently moving to the lowered position.

2. A trailer as defined in claim 1, further comprising:
a powered actuator for moving the locking mechanism between a locking position and unlocking position.

3. A trailer as defined in claim 2, further comprising:
a linkage assembly connected to the powered actuator and to each of the front plate and the rear plate for preventing each plate from inadvertently moving to the lowered position.

4. A trailer as defined in claim 1, wherein the locking mechanism is pivotally connected to the trailer frame and is rotatable between a locking position and an unlocking position.

5. A trailer as defined in claim 1, wherein each of the plurality of supports has a central support axis substantially parallel to the carousel axis.

6. A trailer as defined in claim 1, further comprising:
a fluid powered drive motor for rotating the carousel.

7. A trailer as defined in claim 1, wherein the locking mechanism includes a lock plate having an upper surface for substantially planar engagement with a respective front or rear plate of the powered carousel and a lower surface for substantially planar engagement with the trailer frame when the locking plate is in the locking position.

8. A trailer as defined in claim 7, wherein the lock plate is angled at 55° or more with respect to the carousel axis when the lock plate is in the locking position.

9. A trailer as defined in claim 7, further comprising:
a stop on an upper end of the lock plate for positioning the upper surface for engagement with a respective front or rear plate when the lock plate is in the locking position.

10. A trailer as defined in claim 2, further comprising:
a switch for preventing actuation of the powered actuator when the trailer is other than in the parked position.

11. A trailer for transporting goods, comprising:
a trailer frame, the trailer frame having a longitudinal axis and including at least one side door at least substantially covering an opening in the frame when the side door is in the closed position;

a powered carousel rotatably mounted within the trailer frame, the carousel rotatable about a carousel axis substantially parallel to the longitudinal axis, the powered carousel including a plurality of supports each disposed radially outward from the carousel axis for supporting goods thereon, and a front plate and a rear plate each connected to a front end of a plurality of supports and a rear end of a plurality of supports, respectively;

a lift mechanism for selectively raising and lowering the carousel axis from a raised position to a lowered position;

a locking mechanism for engaging each front plate and rear plate to prevent each plate from inadvertently moving to the lowered position;

a powered actuator for moving the locking mechanism between a locking position and unlocking position; and a linkage assembly connected to the actuator and to each of the front plate and the rear plate for preventing each plate from inadvertently moving to the lowered position.

12. A trailer as defined in claim 11, wherein the locking mechanism is pivotally connected to the trailer frame and is rotatable between a locking position and an unlocking position.

13. A trailer as defined in claim 11, wherein the locking mechanism includes front and rear lock plates each having an upper surface for substantially planar engagement with a respective front or rear plate of the powered carousel and a lower surface for substantially planar engagement with the trailer frame when the locking plate is in the locking position.

14. A trailer as defined in claim 13, wherein each lock plate is angled at 55° or more with respect to the carousel axis when the lock plate is in the locking position.

15. A trailer for transporting goods, comprising:
a trailer frame having a longitudinal axis and including at least one side door at least substantially covering an opening in the frame when the side door is in the closed position;

a powered carousel rotatably mounted within the trailer frame, the carousel rotatable about a carousel axis substantially parallel to the longitudinal axis, the powered carousel including a plurality of supports each radially disposed outward from the carousel axis for supporting goods thereon; and a tire support mechanism for supporting one or more tires on a respective storage support, the tire support mechanism including an elongate restraint, at least one end of the restraint configured for engaging a side of an upright tire positioned on the respective storage support, a restraint support secured to the elongate restraint for supporting the elongate restraint on the upright tire, an elongate flexible member connected to and extending from one of the front plate and rear plate to one of the elongate restraint and the restraint support, and a flexible member ratchet supported on one of the elongate restraint and the restraint support for adjusting a length of the flexible member between a respective end plate and the elongate restraint for locking the elongate restraint in position against the upright tire when the flexible member is taut.

16. A trailer as defined in claim 15, further comprising:
a pair of vertically spaced connectors on one of the front plate and rear plate for connecting an end of the flexible member to the respective plate at a desired elevation.

17. A trailer as defined in claim 15, further comprising:
an adjustment member for selectively adjusting a length of the elongate restraint; and each end of the elongate restraint is configured for engaging opposing sides of an upright tire.

18. A trailer as defined in claim 15, wherein the elongate flexible member is a strap.

19. A trailer as defined in claim 15, further comprising:
a lift mechanism for selectively raising and lowering the carousel axis from a raised position to a lowered position.

20. A trailer as defined in claim 15, further comprising:
a front plate and a rear plate each connected to a front end of a plurality of supports and a rear end of a plurality of supports, respectively.

* * * * *